United States Patent
Saito et al.

(10) Patent No.: US 11,822,075 B2
(45) Date of Patent: Nov. 21, 2023

(54) DISPLAY DEVICE AND INFRARED LIGHT CUT-OFF FILM

(71) Applicant: 3M INNOVATIVE PROPERTIES COMPANY, St. Paul, MN (US)

(72) Inventors: Yuji Saito, Kanagawa (JP); Noboru Iwata, Tokyo (JP); Atsushi Ono, Tokyo (JP); Kentaro Tamura, Kanagawa (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 421 days.

(21) Appl. No.: 16/632,627

(22) PCT Filed: Jul. 27, 2018

(86) PCT No.: PCT/IB2018/055640
§ 371 (c)(1),
(2) Date: Jan. 21, 2020

(87) PCT Pub. No.: WO2019/025923
PCT Pub. Date: Feb. 7, 2019

(65) Prior Publication Data
US 2020/0166749 A1    May 28, 2020

(30) Foreign Application Priority Data
Aug. 2, 2017  (JP) .................. 2017-150198

(51) Int. Cl.
G02B 27/01   (2006.01)
G02B 5/20    (2006.01)
G02B 5/30    (2006.01)

(52) U.S. Cl.
CPC ......... *G02B 27/0101* (2013.01); *G02B 5/208* (2013.01); *G02B 5/3033* (2013.01); *G02B 5/3083* (2013.01); *G02B 2027/0118* (2013.01)

(58) Field of Classification Search
CPC ... G02B 27/0101; G02B 5/208; G02B 5/3083
(Continued)

(56) References Cited

U.S. PATENT DOCUMENTS 7,492,516 B2  2/2009  Takahashi
7,841,730 B2  11/2010  Hara
(Continued)

FOREIGN PATENT DOCUMENTS

JP     11023997     1/1999
JP     2011-203733  10/2011
(Continued)

OTHER PUBLICATIONS

International Search report for PCT International Application No. PCT/IB2018/055640 dated Nov. 14, 2018, 3 pages.

*Primary Examiner* — Jerry L Brooks
(74) *Attorney, Agent, or Firm* — Clifton F. Richardson

(57) ABSTRACT

A display device according to one aspect of the present invention includes: a display unit configured to have display information and emits visible light having a continuous spectrum; an infrared cut-off part configured to transmit the visible light from the display unit and to reduce the amount of infrared light striking the display unit; and a reflecting part configured to reflect the visible light having passed through the infrared cut-off part. The infrared cut-off part includes a first polymer film and a second polymer film, the first polymer film includes an infrared cut-off layer configured to reduce infrared light transmission, and the second polymer film includes a high-retardation polyester film and is disposed between the first polymer film and the display unit.

4 Claims, 6 Drawing Sheets

(58) Field of Classification Search
USPC .......................................................... 359/630
See application file for complete search history.

(56) References Cited

U.S. PATENT DOCUMENTS

| | | |
|---|---|---|
| 2005/0180017 A1 | 8/2005 | Hara |
| 2009/0207490 A1 | 8/2009 | Moriyama |
| 2014/0177040 A1 | 6/2014 | Uehara |
| 2015/0010761 A1 | 1/2015 | Tasaka |
| 2015/0168617 A1* | 6/2015 | Hamada ............... C09K 19/588 |
| | | 359/352 |
| 2017/0199381 A1* | 7/2017 | Kuwabara .............. G02B 27/01 |
| 2019/0359139 A1 | 11/2019 | Taguchi |

FOREIGN PATENT DOCUMENTS

| | | |
|---|---|---|
| JP | 4788882 | 10/2011 |
| JP | 4888853 | 12/2011 |
| JP | 5835128 | 12/2015 |
| JP | 2016-122041 | 7/2016 |
| JP | 2017015778 A | 1/2017 |
| JP | 2017-116882 | 6/2017 |
| WO | WO 2014/123209 | 8/2014 |
| WO | WO 2016-208327 | 12/2016 |

\* cited by examiner

DISPLAY DEVICE AND INFRARED LIGHT CUT-OFF FILM

TECHNICAL FIELD

The present invention relates to a display device and an infrared cut-off film.

BACKGROUND ART

A vehicle head-up display is one example of a display device. A vehicle head-up display includes, for example, a liquid crystal panel disposed inside an instrument panel situated in the car interior. The liquid crystal panel has display information. Visible light emitted by a backlight passes through the liquid crystal panel, then is reflected by a reflective mirror, and reaches the front windshield. The emitted light is reflected by the front windshield, and subsequently reaches the eyes of a driver. The driver visually recognizes the display information from the liquid crystal panel in the form of a virtual image. It is vital for vehicles to reduce the effects of thermal energy from infrared radiation (infrared light) included in outside light (sunlight) upon liquid crystal panels. Patent Literature 1 discloses a vehicle head-up display in which a filter is provided in front of a liquid crystal panel, to block infrared light striking the liquid crystal panel.

SUMMARY OF INVENTION

The filter provided in front of the liquid crystal panel may include, for example, a stretched polymer film. In such cases, refractive index anisotropy occurs in the filter, resulting in birefringence. Thus, when linearly polarized visible light emitted by a display unit such as a liquid crystal panel passes through the filter, the light may be converted from linearly polarized wave to elliptically polarized wave. Elliptically polarized visible light, when reflected by the front windshield, varies in light reflectance depending on the polarization component. As a result, differences may arise between the display information immediately after emitted by the display unit and the display information perceived by the driver, resulting in inferior visibility. Further improvement of the filter is necessary in order to cut off infrared light striking the display unit while maintaining visibility to drivers.

A display device according to one aspect of the present invention is a display device including: a display unit configured to have display information and is configured to emit visible light having a continuous spectrum; an infrared cut-off part configured to transmit the visible light from the display unit and configured to reduce an amount of infrared light that strikes the display unit; and a reflecting part configured to reflect the visible light that has passed through the infrared cut-off part. The infrared cut-off part includes a first polymer film and a second polymer film, the first polymer film including an infrared cut-off layer configured to reduce infrared light transmission, and the second polymer film including a high-retardation polyester film and being disposed between the first polymer film and the display unit.

According to this aspect, the infrared cut-off part transmits the visible light from the display unit and reduces the amount of infrared light striking the display unit. As a result, the effects of thermal energy from infrared light in, for example, sunlight upon the display unit are reduced. The infrared cut-off part transmits visible light, thereby allowing the visible light having the display information to reach the reflecting part. In addition, the second polymer film of the infrared cut-off part is disposed between the first polymer film and the display unit, with the result that the visible light emitted by the display unit passes through the second polymer film before striking the first polymer film. The second polymer film includes a high-retardation polyester film, with the result that the polarization direction of the visible light having passed through the second polymer film varies periodically with respect to wavelength due to the high retardation of the film, while the wavelength interval, within which polarization direction varies, shortens greatly, resulting in a quasi-depolarized state as seen on average with respect to wavelength. By this quasi-depolarized state, even in a case where the first polymer film imparts elliptical polarization properties to the visible light having passed through the second polymer film, such elliptical polarization will be inconspicuous when the light is reflected by the reflecting part, thereby reducing rainbow glare.

According to one aspect of the present invention, the amount of infrared light striking a display unit can be more easily reduced while the visibility of display information is maintained.

DESCRIPTION OF EMBODIMENTS

Figure 1:
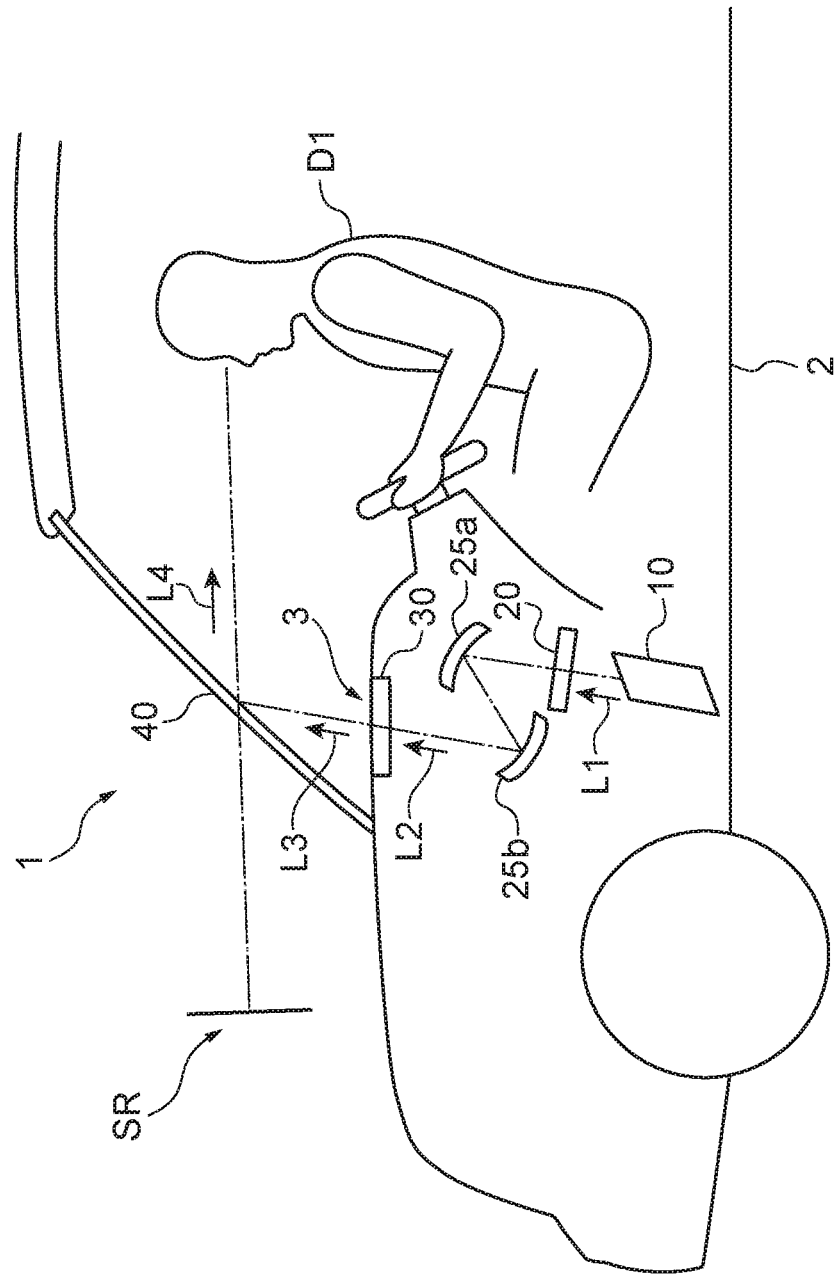
FIG. 1 is an illustration of a display device according to one embodiment.

An embodiment of the present invention is a display device including: a display unit configured to have display information and is configured to emit visible light having a continuous spectrum; an infrared cut-off part configured to transmit the visible light from the display unit and configured to reduce an amount of infrared light that strikes the display unit; and a reflecting part configured to reflect the visible light that has passed through the infrared cut-off part. The infrared cut-off part includes a first polymer film and a second polymer film, the first polymer film including an infrared cut-off layer configured to reduce infrared light transmission, and the second polymer film including a high-retardation polyester film and being disposed between the first polymer film and the display unit.

The infrared cut-off part transmits the visible light from the display unit and reduces the amount of infrared light striking the display unit. As a result, the effects of thermal energy from infrared light in, for example, sunlight upon the display unit are reduced. The infrared cut-off part transmits visible light, thereby allowing the visible light having the display information to reach the reflecting part. In addition, the second polymer film of the infrared cut-off part is disposed between the first polymer film and the display unit, with the result that the visible light emitted by the display unit passes through the second polymer film before striking the first polymer film. The second polymer film includes a high-retardation polyester film, with the result that the polarization direction of the visible light having passed through the second polymer film varies periodically with respect to wavelength due to the high retardation of the film, while the wavelength interval, within which polarization direction varies, shortens greatly, resulting in a quasi-depolarized state as seen on average with respect to wavelength. By this quasi-depolarized state, even in a case where the first polymer film imparts elliptical polarization properties to the visible light having passed through the second polymer film, such elliptical polarization will be inconspicuous when the light is reflected by the reflecting part, thereby reducing rainbow glare.

As used herein, the term "display information" broadly includes information from which, when see the information, one can comprehend or identify a specific meaning, and in the case of on-board display devices, examples of the information broadly include maps, traffic signs, and other navigational information. The term "visible light having a continuous spectrum" refers to light in the visible spectrum that, although exhibiting differences in intensity at different wavelengths, has an unbroken, continuous spectrum of wavelengths. The expression "reducing the amount of infrared light striking the display unit" refers to the amount of infrared light striking the display unit being reduced by being absorbed or reflected. The "second polymer film" being "disposed between the first polymer film and the display unit" means that the visible light from the display unit first passes through the second polymer film, and the transmitted light then passes through the first polymer film.

In a display device according to another aspect, the high-retardation polyester film may contain at least one of polyethylene terephthalate and polyethylene naphthalate.

In a display device according to another aspect, the high-retardation polyester film may have a retardation from 5000 nm to 30000 nm, both inclusive.

In a display device according to another aspect, the infrared cut-off part may include a reflective polarizing film.

An infrared cut-off film according to yet another aspect of the present invention is an infrared cut-off film that is configured to transmit visible light from one side and to reduce the amount of incident infrared light from the other side, the infrared cut-off film including a first polymer film configured to reduce the amount of incident infrared light and a second polymer film disposed upon the first polymer film, and the second polymer film including a high-retardation polyester film.

An infrared cut-off film according to another aspect may further include a reflective polarizing film.

Embodiments of the display device and infrared cut-off film will now be described in detail with reference to the drawings. In this description, identical elements will be identically labeled, and redundant descriptions thereof will be omitted.

FIG. 1 is an illustration of a display device according to an embodiment of the present invention. FIG. 1 illustrates an example of the display device according to one embodiment being applied as a vehicle head-up display. A display device 1 within a vehicle 2 includes a light source 10, a display unit 20, a first light path converter 25a, a second light path converter 25b, an infrared cut-off part 30, and a reflecting part 40. The light source 10 includes, for example, a xenon lamp, a halogen lamp, or a cold cathode tube, and emits linearly polarized visible light L1 toward the display unit 20. The display unit 20 includes, for example, a liquid crystal panel, an organic EL panel, a digital mirror device, or a MEMS display. The display unit 20 receives visible light L1 from the light source 10 and forms display information, and visible light L2 having the display information is emitted toward the infrared cut-off part 30. The visible light L2 has a continuous spectrum. In a case where the display unit 20 includes, for example, an organic EL panel, the display unit 20 and the light source 10 may be integrated. The first light path converter 25a and the second light path converter 25b are provided as necessary, the first light path converter 25a being capable of forming a pair with the second light path converter 25b to alter the path of the visible light L1.

The infrared cut-off part 30 includes an infrared cut-off film 3. The infrared cut-off part 30 transmits the visible light L2 from the display unit 20, and emits transmitted visible light L3 toward the reflecting part 40. The infrared cut-off part 30 reduces the amount of infrared light striking the display unit 20. The reflecting part 40 includes, for example, a front windshield, and reflects the visible light L3 having passed through the infrared cut-off part 30 toward a driver D1. In a case where the reflecting part 40 is a front windshield, the driver D1, receiving visible light L4 reflected by the front windshield, can see, the display information as if this information is present at a virtual position SR in addition to the field of view to the exterior and front of the vehicle 2, through the front windshield.

Figure 2A:
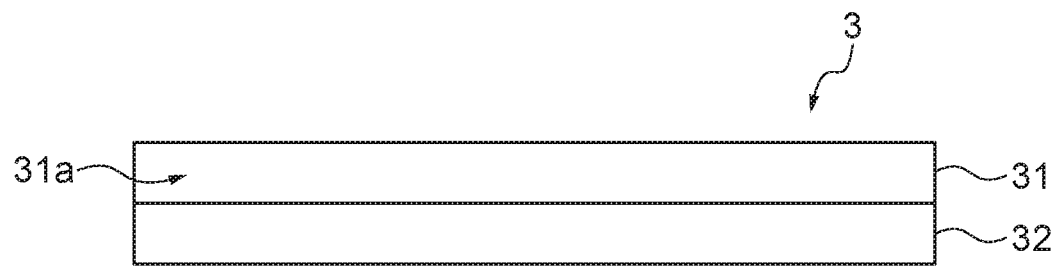
FIGS. 2A to 2C are illustrations of an infrared cut-off film according to the one embodiment.
Figure 2B:
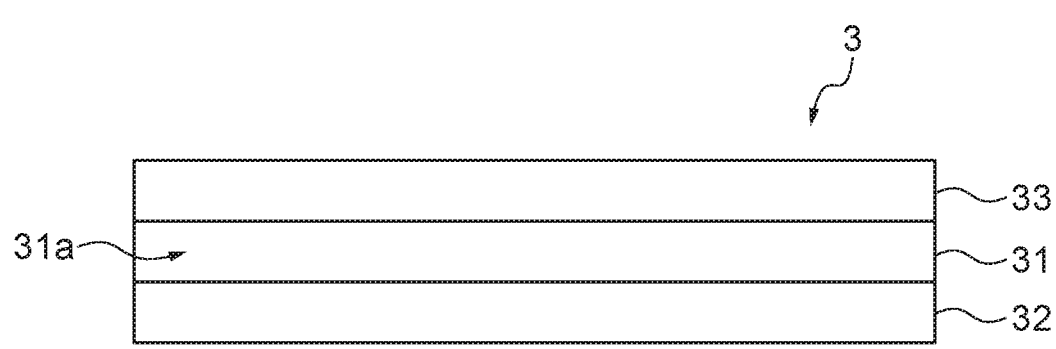
Figure 2C:
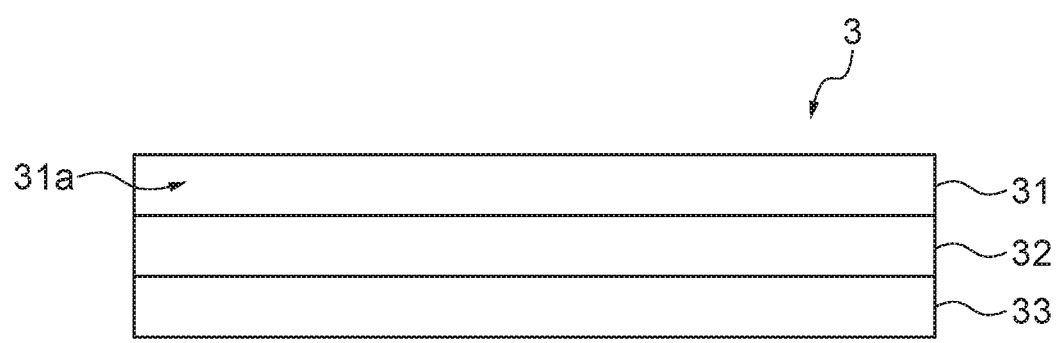

FIGS. 2A to 2C are illustrations of the infrared cut-off film according to one embodiment. An infrared cut-off film 3 transmits visible light from one side, and reduces the amount of incident infrared light from the other side. As illustrated in FIG. 2A, the infrared cut-off film 3 includes a first polymer film 31 and a second polymer film 32. When the infrared cut-off film 3 is installed at a specific position, the second polymer film 32 is disposed between the first polymer film 31 and the display unit 20. As illustrated in FIG. 1 and FIG. 2A, the visible light L2 from the display unit 20 first strikes the second polymer film 32. The visible light having passed through the second polymer film 32 strikes the first polymer film 31. Once having passed through the first polymer film 31, the visible light L2 is capable of traveling toward the reflecting part 40.

The first polymer film 31 is an infrared-reducing film for reducing the amount of infrared light striking the display unit 20, and can be a single-layered polymer film or a multi-layered polymer film. In a case where the first polymer film 31 is a single-layered polymer film, the single-layered polymer film can contain, for example, polyethylene terephthalate (PET), polyethylene naphthalate (PEN), an acrylic resin, a polycarbonate resin, an olefin resin, or a polyimide resin. The thickness of the single-layered polymer film is, for example, from 50 to 200 μm. In a case where the first polymer film 31 is a multi-layered polymer film, the multi-layered polymer film has a structure including, for example, alternating first polymer layers and second polymer layers.

The first polymer film 31 has a first axis along which the index of refraction is greatest. In a case where the film is stretched in only one direction (uniaxially oriented) during manufacturing, the direction of stretch corresponds to the first axis. In a case where the film is stretched in two directions (biaxially oriented) during manufacturing, one of the two directions of stretch corresponds to the first axis.

The first polymer film 31 includes an infrared cut-off layer 31a for reducing the amount of transmitted infrared light.

The infrared cut-off layer 31a includes, for example, a metal, a metal alloy, or an oxide semiconductor, and mainly reflects near-infrared and infrared light having a wavelength of 1 µm or greater. Metals include, for example, silver, gold, copper, or aluminum. Silver is an especially preferred metal, as it can easily be worked into a thin film, and readily reflects near-infrared and infrared light. Metal alloys include silver alloys, stainless steel, and Inconel. Among metal alloys, a silver alloy containing at least 30 mass % silver is an especially preferred material, as such will facilitate the manufacturing of thin films, and readily reflects near-infrared and infrared light. A silver alloy containing silver and less than 50 mass % gold and/or less than 20 mass % copper is also a preferred material, as such will have superior durability. Oxide semiconductors include, for example, tin dioxide ($SnO_2$), zinc oxide (ZnO), and indium tin oxide (ITO), with ITO being especially preferably included. The metal, metal alloy, or oxide semiconductor may form a single layer or multiple layers.

The second polymer film 32 includes a high-retardation polyester film. The polyester film can include at least one of polyethylene terephthalate and polyethylene naphthalate. The second polymer film 32 has a slow axis along which the index of refraction is greatest, and a fast axis along which the index of refraction is lowest. In a case where the film is stretched in a given direction during manufacturing, the direction of stretch can correspond to the slow axis Sx1. The fast axis can be an axis orthogonal to the slow axis Sx1. The thickness of the high-retardation polyester film is, for example, from 10 to 300 µm.

Figure 3A:
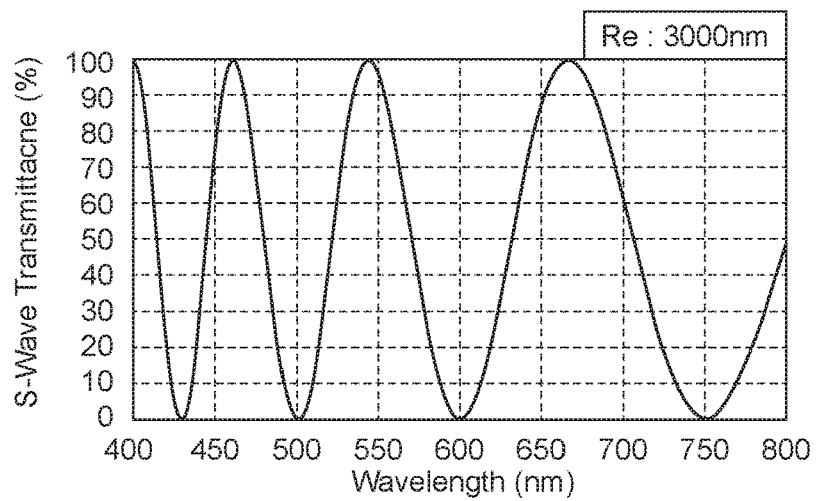
FIGS. 3A to 3C are graphs illustrating the relationship between visible light wavelength and s-wave transmittance in a high-retardation film according to the one embodiment.
Figure 3B:
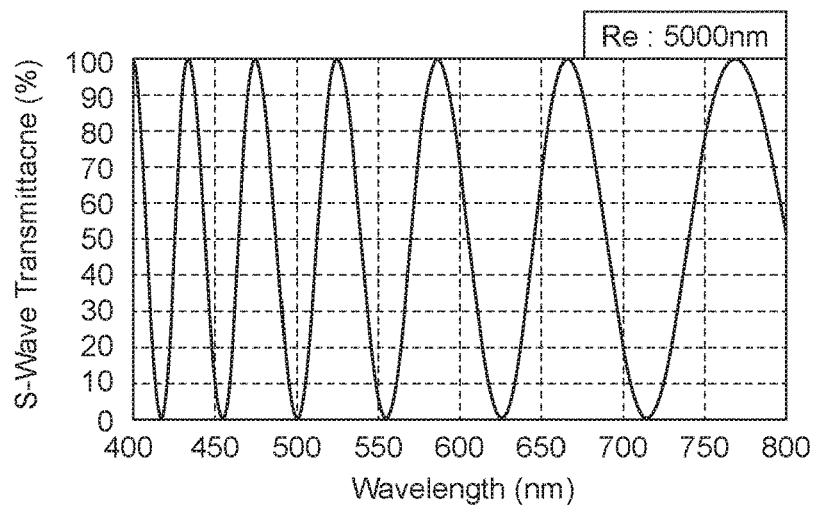
Figure 3C:
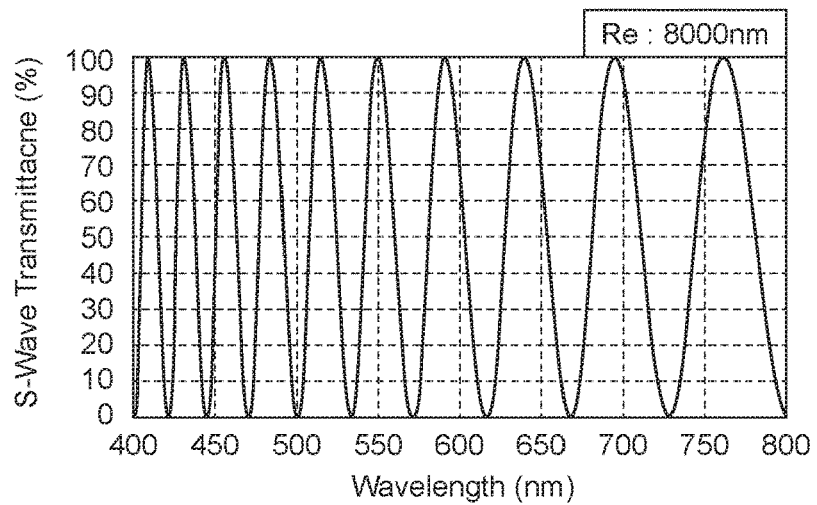
Figure 4A:
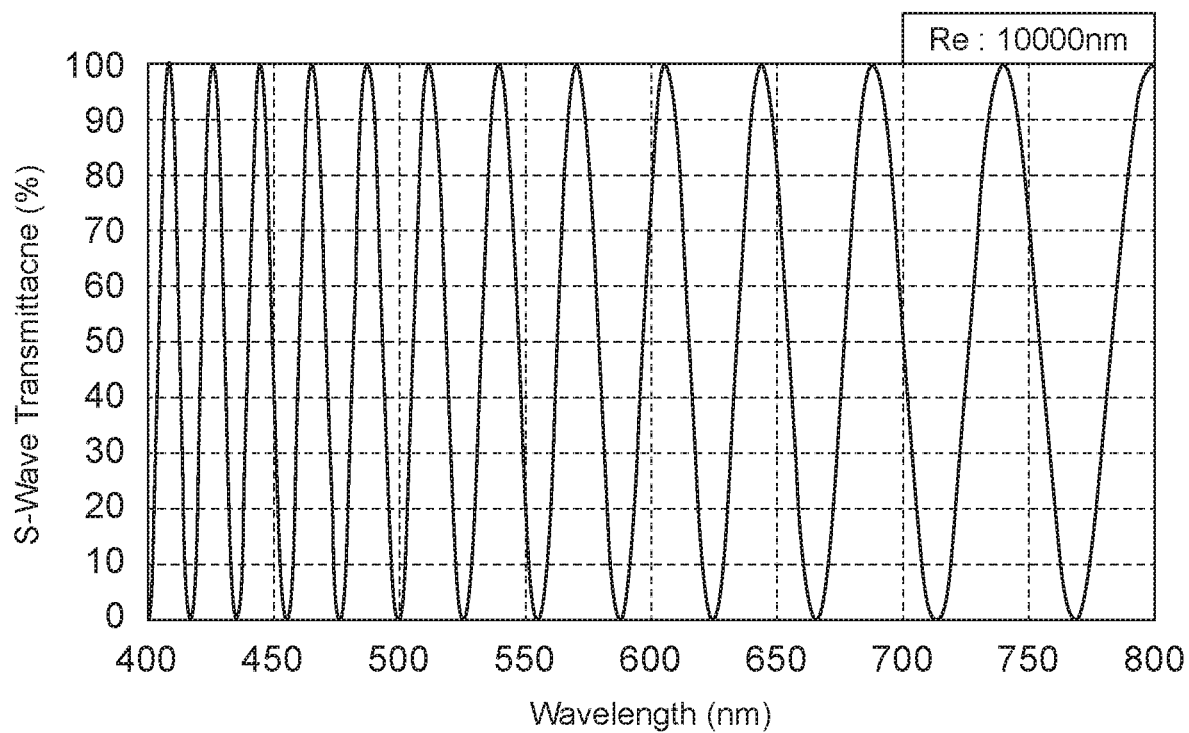
FIGS. 4A and 4B are graphs illustrating the relationship between visible light wavelength and s-wave transmittance in the high-retardation film according to the one embodiment.
Figure 4B:
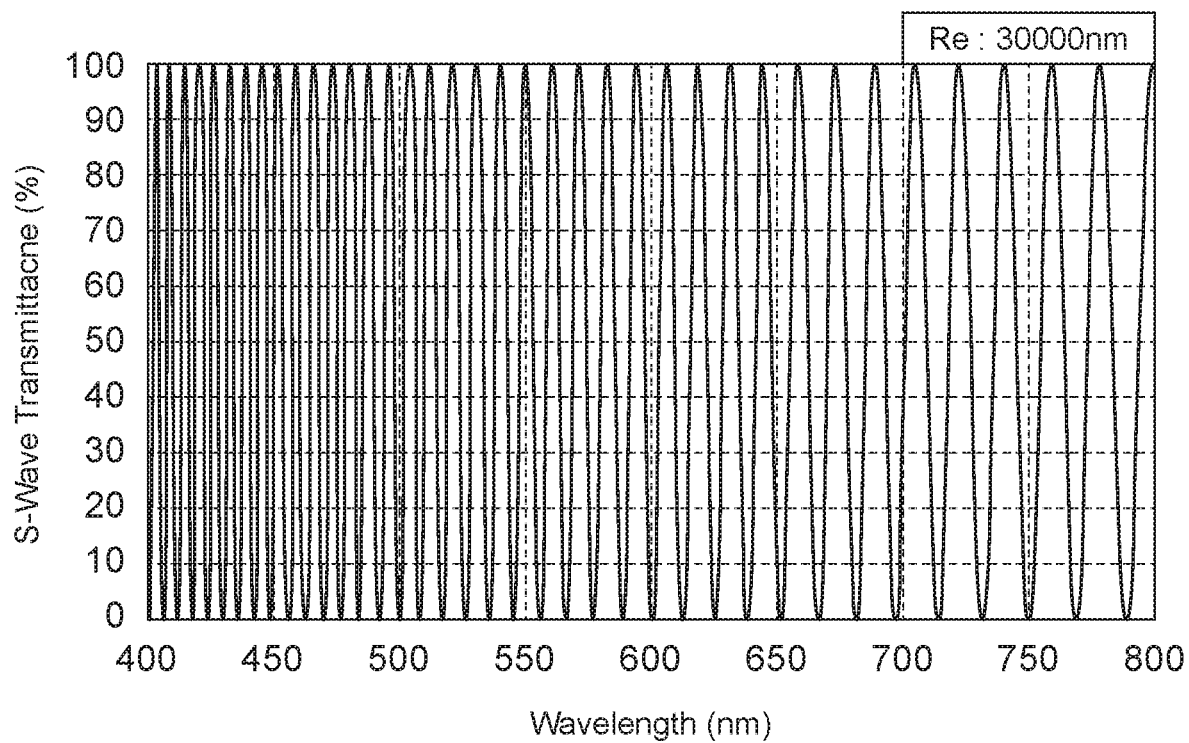

FIGS. 3 and 4 are graphs illustrating the relationship between visible light wavelength and s-wave transmittance in high-retardation films, illustrating results for s-wave transmittance of the visible light having passed through an analyzer when the high-retardation films are placed between a polarizer and the analyzer in a crossed-nicols arrangement. Visible light has a continuous spectrum, and the slow axis Sx1 of the high-retardation film has an inclination of 45° with respect to the axis of polarization of the polarizer. FIG. 3A illustrates results for a retardation (Re) of 3000 nm. FIG. 3B illustrates results for a retardation of 5000 nm, and FIG. 3C illustrates results for a retardation of 8000 nm. FIG. 4A illustrates results for a retardation of 10000 nm, and FIG. 4B illustrates results for a retardation of 30000 nm.

As seen in FIGS. 3A to 4B, the s-wave transmittance of the visible light having passed through the analyzer repeatedly increases and decreases as wavelength changes, and the wavelength interval of this increasing and decreasing decreases as retardation increases. These results show that the polarization direction of the visible light having passed through the high-retardation films increases and decreases periodically with respect to wavelength, while the wavelength interval, within which polarization direction varies, shortens greatly, resulting in a quasi-depolarized state as seen on average with respect to wavelength. By this quasi-depolarized state, even in a case where the first polymer film 31 imparts elliptical polarization properties to the visible light having passed through the second polymer film 32, such elliptical polarization will be inconspicuous when the light is reflected by the reflecting part 40, thereby reducing rainbow glare.

The high-retardation polyester film can have a retardation in a range from 5000 nm to 30000 nm, both inclusive. Having a retardation value of at least 5000 nm greatly shortens the wavelength interval, within which polarization direction varies, resulting in a quasi-depolarized state as seen on average with respect to wavelength. By this quasi-depolarized state, even in a case where the first polymer film 31 imparts elliptical polarization properties to the visible light having passed through the second polymer film 32, such elliptical polarization will be inconspicuous when the light is reflected by the reflecting part 40, thereby reducing rainbow glare. The high-retardation polyester film may have a retardation of at least 8000 nm. Having a retardation value of at least 8000 nm greatly shortens the wavelength interval, within which polarization direction varies, resulting in a quasi-depolarized state as seen on average with respect to wavelength. By this quasi-depolarized state, even in a case where the first polymer film 31 imparts elliptical polarization properties to the visible light having passed through the second polymer film 32, such elliptical polarization will be even more inconspicuous when the light is reflected by the reflecting part 40, thereby further reducing rainbow glare. Having a retardation value of the high-retardation polyester film not greater than 30000 nm allows to improve the visibility of rainbow glare and to maintain the ease of manufacturing, mechanical strength, etc., of the film.

In the display device 1 according to the present embodiment, the infrared cut-off part 30 transmits the visible light from the display unit 20 and reduces the amount of infrared light striking the display unit 20. As a result, the effects of thermal energy from infrared light in, for example, sunlight upon the display unit 20 are reduced. The infrared cut-off part 30 transmits visible light, thereby allowing the visible light having the display information to reach the reflecting part. The present embodiment is one including an infrared cut-off layer 31a; however, the first polymer film 31 is capable of reducing the amount of infrared light striking the display unit 20 even if an infrared cut-off layer 31a is not included, although there will be a certain degree of difference.

In addition, the second polymer film 32 of the infrared cut-off part 30 of the display device 1 is disposed between the first polymer film 31 and the display unit, with the result that visible light emitted by the display unit 20 passes through the second polymer film 32 before striking the first polymer film 31. The second polymer film 32 includes a high-retardation polyester film, with the result that the polarization direction of the visible light having passed through the second polymer film 32 varies periodically with respect to wavelength due to the high retardation of the film, while the wavelength interval, within which polarization direction varies, shortens greatly, resulting in a quasi-depolarized state as seen on average with respect to wavelength. By this quasi-depolarized state, even in a case where the first polymer film 31 imparts elliptical polarization properties to the visible light having passed through the second polymer film 32, such elliptical polarization will be inconspicuous when the light is reflected by the reflecting part 40, thereby reducing rainbow glare.

In the present embodiment, as illustrated in FIGS. 2B and 2C, the infrared cut-off film 3 can further include a reflective polarizing film 33. The reflective polarizing film 33 is an optical film manufactured by layering multiple optically anisotropic layers, and has optical transparency like that of a polarizing plate. These films include 3M (trade name) DBEF Film (Dual Brightness Enhancement Film, available from 3M) and 3M (trade name) APF Film (Advanced Polarizer Film, available from 3M). Infrared light in sunlight has various polarization states, and thus will be filtered depending on polarization state when passing through the reflective polarizing film 33. For example, of the various types of polarized light in sunlight, linearly polarized light, which passes through the reflective polarizing film 33, mainly passes thorough, thereby reducing the amount of infrared light striking the display unit 20.

The reflective polarizing film 33 can be provided upon the first polymer film 31 as illustrated in FIG. 3A, or upon the second polymer film 32 as illustrated in FIG. 3B. In either arrangement, the reflective polarizing film 33 can have similar optical properties.

In the present embodiment, there is no particular limitation upon the method used to dispose the second polymer film 32 over the first polymer film 31 or the method used to dispose the reflective polarizing film 33 over the first polymer film 31 or the second polymer film 32; a known method may be used.

One example method is to use an adhesive to anchor the films in place. Specific examples of adhesives that can be used are pressure-sensitive adhesives, hot melt adhesives, active-energy-curable adhesives, moisture-curable adhesives, heat-curable adhesives, and anaerobic adhesives; the type of adhesive used can be determined as appropriate according, for example, to the materials used for the respective films. For example, an acrylic, vinyl alcohol, silicone, polyester, polyurethane, polyether, or other adhesive can be used, as can high-transparency adhesives. These adhesives may be applied as-is, for example, to the surfaces of the polymer films, or a layer such as a tape or sheet of adhesive may be bonded to part or all of the surfaces of the polymer films. Another possible method of disposing the films is to prepare a frame capable of at least partially encompassing the ends of the polymer films, and layer and anchor the films using the frame.

In the process of manufacturing the first polymer film 31, the film can be formed by simultaneously extruding the polymer material(s) used in the film, whether a single-layered or multi-layered film is produced. Next in the process of manufacturing the film, the film is subjected to an orientation treatment by being stretched at a given temperature, allowing a film of the desired thickness to be formed. The film may be subjected to a heat curing treatment at a given temperature, as necessary. The extrusion and orientation treatments can be performed simultaneously. The high-retardation polyester film can also be manufactured in accordance with a process similar to that used for the first polymer film 31.

The first polymer layer included in the first polymer film 31 includes, for example, crystalline, semicrystalline, and liquid-crystalline polymers and copolymers. The average thickness of the first polymer layer is, for example, 0.5 microns or less. PEN is an especially preferable material for inclusion in the first polymer layer, and is heat-stable within a range from about 155° C. to about 230° C. Examples of especially preferable materials other than PEN include polybutylene naphthalate and other crystalline naphthalene dicarboxylic acid polyesters. The second polymer layer of the first polymer film 31 can contain, for example, polyethylene terephthalate (PET) or coPEN. The average thickness of the second polymer layer is, for example, 0.5 microns or less, and the indexes of refraction of the resin contained in the first polymer layer and the resin contained in the second polymer layer may differ by 0.03 or more.

The infrared cut-off layer 31a is formed, for example, via thermal decomposition, powder coating, vapor deposition, cathode sputtering, or ion plating, and is formed upon the polymer film from a metal, an oxide semiconductor, or a metal alloy. Cathode sputtering and ion plating are preferred methods, as they yield uniform film structure and thickness. The infrared cut-off layer 31a may be a separate metallized polymer or glass sheet laminated onto the multi-layered polymer film using an adhesive. Examples of adhesives include hot melt adhesives (e.g., VITEL 3300, obtainable from the Shell Chemical Company at 4040 Embassy Parkway Akron, Ohio 44333) and pressure-sensitive adhesives (e.g. 90/10 IOA/AA and 95/5 IOA/acrylamide acrylic adhesives obtainable from the 3M Company in St. Paul, MM 55144).

A metal or metal alloy included in the infrared cut-off layer 31a can be applied to a thickness from about 10 nm to about 40 nm, preferably from about 12 nm to about 30 nm. An oxide semiconductor layer can be applied to a thickness from about 20 nm to about 200 nm, preferably from about 80 nm to about 120 nm. In a case where the infrared cut-off layer 31a is a metallized polymer or glass sheet laminated onto a multi-layered polymer film, the thickness of the metal or metal alloy coating upon the sheet will be, for example, from about 10 nm to about 40 nm; the thickness of an oxide semiconductor coating upon a sheet will be, for example, from about 20 nm to about 200 nm.

EXAMPLES

The display device and infrared cut-off film will now be described in further detail with the aid of examples of the present invention and comparative examples. The present invention is not limited to the following examples.

Example 1

Figure 5:
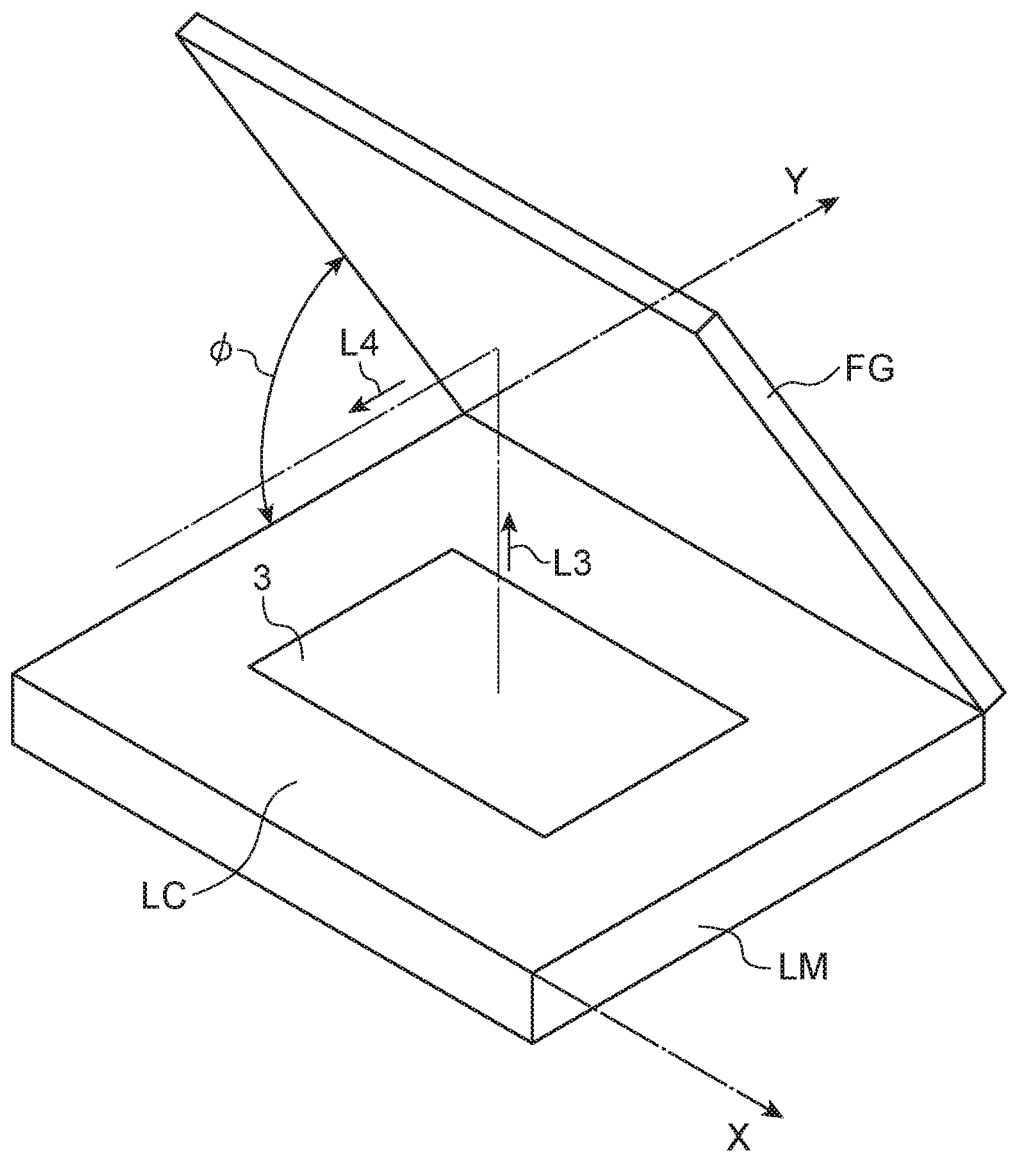
FIG. 5 is a schematic illustration of a measuring system for evaluating the visible light having passed through the infrared cut-off film.

FIG. 5 is a schematic illustration of a measuring system for evaluating the visible light having passed through an infrared cut-off film in Example 1. The measuring system uses a liquid crystal monitor LM (DuraVision FDX1503 15-inch TN color liquid crystal monitor, available from EIZO) for the light source 10 and the display unit 20, and float glass FG for the reflecting part 40. The liquid crystal monitor LM includes a liquid crystal display LC. The float glass FG is substantially transparent to the visible spectrum, and has a thickness of about 1 mm. The angle of incidence φ of the visible light L3 with respect to the reflecting part 40 is about 45°. The angle of reflection of the visible light L4 to an observer corresponding to the driver D1 is also about 45°, and the observer is capable of observing the reflecting part 40 in front of the reflecting part.

Figure 6A:
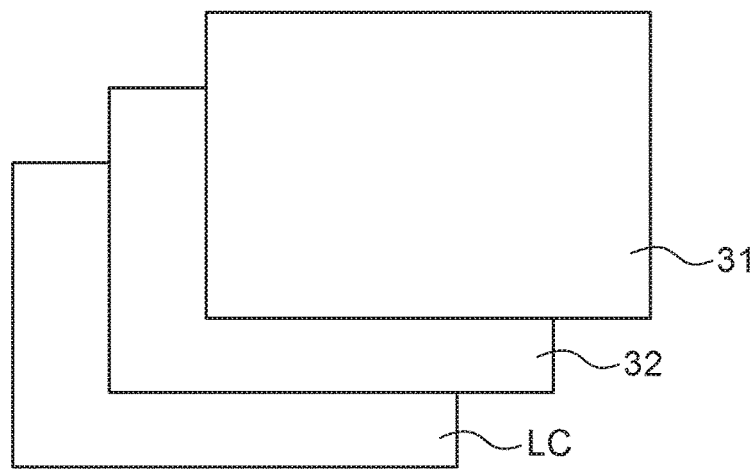
FIGS. 6A to 6C are illustrations of an infrared cut-off film according to Example 1, and the directions of a transmission axis of a liquid crystal display and a slow axis of a high-retardation film.

As illustrated in FIGS. 5 and 6A, the infrared cut-off film 3 is laid over the liquid crystal display LC of the liquid crystal monitor LM. In Example 1, a first polymer film 31 (infrared-reducing film) and a second polymer film (high-retardation film) 32 were used for the infrared cut-off film 3. The high-retardation film is laid over the liquid crystal monitor LM, after which the infrared-reducing film is laid over the high-retardation film. The infrared-reducing film is laid over the infrared-reducing film without the high-retardation film and the infrared-reducing film being bonded to each other. In FIG. 6A, the positions of the display and the film are shifted in order to illustrate the mutual relationship of the layered display and films.

Figure 6B:
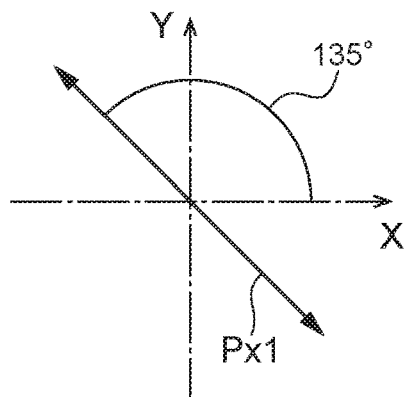

The liquid crystal display LC emits the linearly polarized visible light L2 toward the infrared cut-off film 3. The polarization direction of the emitted visible light L2 is substantially along the polarization axis of the liquid crystal display LC, i.e., transmission axis Px1. As illustrated in FIG. 6B, transmission axis Px1 has an angle of inclination of 135° in the counterclockwise direction with respect to one axis (the x-axis) of the liquid crystal display LC. The y-axis is orthogonal to the x-axis.

In Example 1, the infrared-reducing film is a 3M (trade name) Scotchtint (trade name) NANO 90S Multi-layered Window Film (available from 3M). The size of the infrared-reducing film is about 20 cm by about 30 cm, excluding the adhesive layer and the surface hard coat layer. The infrared-reducing film includes at least 200 layers.

Figure 6C:
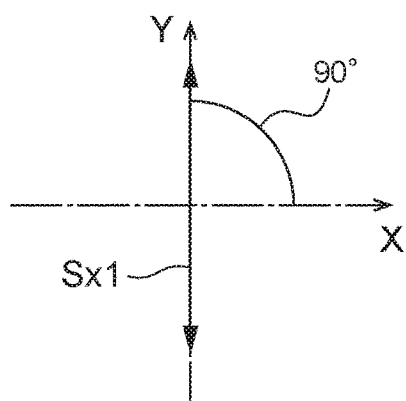

The high-retardation film is an ultra-high birefringent hard coating film (available from Panasonic) having a retardation of 10000 nm. As illustrated in FIG. 6C, the slow axis Sx1 of the high-retardation film has an angle of inclination of 90° in the counterclockwise direction with respect to the x-axis, and forms an angle of 45° with the transmission axis Px1 of the liquid crystal display LC. The stretching axis of the infrared-reducing film has an angle of inclination of 0° or 90° in the counterclockwise direction with respect to the x-axis.

The brightness and presence of rainbow glare with regard to the visible light reflected by the float glass FG after having passed through the infrared cut-off film 3 in Example 1 were visually checked by observers.

Example 2

In Example 2, the high-retardation film, the infrared-reducing film, and a reflective polarizing film were laid in that order over the liquid crystal display LC as the infrared cut-off film 3. The transmission axis Px1 of the liquid crystal display LC has an angle of inclination of 135° in the counterclockwise direction with respect to the x-axis. The slow axis Sx1 of the high-retardation film has an angle of inclination of 135° in the counterclockwise direction with respect to the x-axis, and forms an angle of 45° with the transmission axis Px1 of the liquid crystal display LC. The stretching axis of the infrared-reducing film has an angle of inclination of 0° or 90° in the counterclockwise direction with respect to the x-axis. The transmission axis of the reflective polarizing film has an angle of inclination of 0° in the counterclockwise direction with respect to the x-axis, and forms an angle of 45° with the transmission axis Px1 of the liquid crystal display LC. The high-retardation film is an ultra-high birefringent hard coating film (available from Panasonic). The infrared-reducing film is a 3M (trade name) Scotchtint (trade name) NANO 90S Multi-layered Window Film (available from 3M). The reflective polarizing film is a 3M (trade name) DBEF film (available from 3M).

The brightness and presence of rainbow glare with regard to the visible light reflected by the float glass FG in Example 2 were visually checked by observers using an apparatus and procedure similar to those used in Example 1.

Example 3

In Example 3, the high-retardation film, the infrared-reducing film, and the reflective polarizing film were laid in that order over the liquid crystal display LC as the infrared cut-off film 3. The transmission axis of the reflective polarizing film has an angle of inclination of 90° in the counterclockwise direction with respect to the x-axis, and forms an angle of 45° with the transmission axis Px1 of the liquid crystal display LC. The infrared cut-off film 3 has a configuration similar to that of Example 2, except that the direction of the transmission axis of the reflective polarizing film is different.

The brightness and presence of rainbow glare with regard to the visible light reflected by the float glass FG in Example 3 were visually checked by observers using an apparatus and procedure similar to those used in Example 1.

Example 4

In Example 4, the reflective polarizing film, the high-retardation film, and the infrared-reducing film were laid in that order over the liquid crystal display LC as the infrared cut-off film 3. The transmission axis Px1 of the liquid crystal display LC has an angle of inclination of 135° in the counterclockwise direction with respect to the x-axis. The transmission axis of the reflective polarizing film has an angle of inclination of 135° in the counterclockwise direction with respect to the x-axis, and forms an angle of 0° with the transmission axis Px1 of the liquid crystal display LC. The slow axis Sx1 of the high-retardation film has an angle of inclination of 90° in the counterclockwise direction with respect to the x-axis, and forms an angle of 45° with the transmission axis Px1 of the liquid crystal display LC. The reflective polarizing film is a 3M (trade name) DBEF film (available from 3M). The stretching axis of the infrared-reducing film has an angle of inclination of 0° or 90° in the counterclockwise direction with respect to the x-axis. The high-retardation film is an ultra-high birefringent hard coating film (available from Panasonic). The infrared-reducing film is a 3M (trade name) Scotchtint (trade name) NANO 90S Multi-layered Window Film (available from 3M).

The brightness and presence of rainbow glare with regard to the visible light reflected by the float glass FG in Example 4 were visually checked by observers using an apparatus and procedure similar to those used in Example 1.

Example 5

In Example 5, the reflective polarizing film, the high-retardation film, and the infrared-reducing film were laid in that order over the liquid crystal display LC as the infrared cut-off film 3. The transmission axis of the reflective polarizing film has an angle of inclination of 45° in the counterclockwise direction with respect to the x-axis, and forms an angle of 90° with the transmission axis Px1 of the liquid crystal display LC. The infrared cut-off film 3 has a configuration similar to that of Example 4, except that the direction of the transmission axis of the reflective polarizing film is different.

The brightness and presence of rainbow glare with regard to the visible light reflected by the float glass FG in Example 5 were visually checked by observers using an apparatus and procedure similar to those used in Example 1.

Example 6

In Example 6, a polycarbonate film, the high-retardation film, the infrared-reducing film, the reflective polarizing film, and another polycarbonate film were laid in that order over the liquid crystal display LC as the infrared cut-off film 3. The transmission axis Px1 of the liquid crystal display LC has an angle of inclination of 135° in the counterclockwise direction with respect to the x-axis. The slow axis Sx1 of the high-retardation film has an angle of inclination of 90° in the counterclockwise direction with respect to the x-axis, and forms an angle of 45° with the transmission axis Px1 of the liquid crystal display LC. The stretching axis of the infrared-reducing film has an angle of inclination of 0° or 90° in the counterclockwise direction with respect to the x-axis. The transmission axis of the reflective polarizing film has an angle of inclination of 0° in the counterclockwise direction with respect to the x-axis, and forms an angle of 45° with the transmission axis Px1 of the liquid crystal display LC. The high-retardation film is an ultra-high birefringent hard coating film (available from Panasonic). The infrared-reducing film is a 3M (trade name) Scotchtint (trade name) NANO 90S Multi-layered Window Film (available from 3M). The reflective polarizing film is a 3M (trade name) DBEF film (available from 3M). In Example 6, unlike Examples 1 to 5, the films were bonded to each other with adhesive.

The brightness and presence of rainbow glare with regard to the visible light reflected by the float glass FG in Example 6 were visually checked by observers using an apparatus and procedure similar to those used in Example 1.

Comparative Example 1

In Comparative Example 1, the infrared-reducing film was laid over the liquid crystal display LC as the infrared cut-off film 3. The transmission axis Px1 of the liquid crystal display LC has an angle of inclination of 135° in the counterclockwise direction with respect to the x-axis. The stretching axis of the infrared-reducing film has an angle of inclination of 0° or 90° in the counterclockwise direction with respect to the x-axis. The infrared-reducing film is a 3M (trade name) Scotchtint (trade name) NANO 90S Multi-layered Window Film (available from 3M).

The brightness and presence of rainbow glare with regard to the visible light reflected by the float glass FG in Comparative Example 1 were visually checked by observers using an apparatus and procedure similar to those used in Example 1.

Table 1 shows the infrared cut-off film configurations and evaluation results for Examples 1 to 3, and Table 2 shows the infrared cut-off film configurations and evaluation results for Examples 4 to 6. Table 3 shows the infrared cut-off film configuration and evaluation results for Comparative Example 1. Tables 1 to 3 show the directions of the transmission axis of the liquid crystal display of the liquid crystal monitor, the films making up the infrared cut-off films on the liquid crystal display and the directions of the transmission axis or slow axis thereof, and the evaluation results obtained by visual observation by observers. In Tables 1 to 3, the various films laid over the liquid crystal display of the liquid crystal monitor are labeled "first sheet", "second sheet", etc., in accordance with the order in which they are laid. For example, in Example 1, the high-retardation film is laid over the liquid crystal display, and the infrared-reducing film is laid over the high-retardation film; thus, the high-retardation film is labeled as the first sheet, and the infrared-reducing film is labeled as the second sheet. In the tables, the notation "135°" in "Liquid crystal display)(135°" in Example 1, for example, means the inclination of the transmission axis with respect to the x-axis in angle in the counterclockwise direction.

In the "RATING" field of Tables 1 to 3, "A (especially good)" indicates that visual evaluation by observers revealed that the reflected visible light had sufficient brightness and no observed rainbow glare. "B (good)" indicates that visual evaluation by observers revealed that the reflected visible light had less brightness than a rating of "A", but no observed rainbow glare. In the "RATING" field, "C (unacceptable)" indicates that visual evaluation by observers revealed that the reflected visible light had less brightness than a rating of "A", and exhibited rainbow glare.

TABLE 1

|  | EXAMPLE 1 | EXAMPLE 2 | EXAMPLE 3 |
| --- | --- | --- | --- |
| LIQUID CRYSTAL MONITOR | LIQUID CRYSTAL DISPLAY (135°) | LIQUID CRYSTAL DISPLAY (135°) | LIQUID CRYSTAL DISPLAY (135°) |
| FIRST SHEET | HIGH-RETARDATION FILM (90°) | HIGH-RETARDATION FILM (90°) | HIGH-RETARDATION FILM (90°) |
| SECOND SHEET | INFRARED CUT-OFF FILM | INFRARED CUT-OFF FILM | INFRARED CUT-OFF FILM |
| THIRD SHEET | — | REFLECTIVE POLARIZING FILM (0°) | REFLECTIVE POLARIZING FILM (90°) |
| RATING | A | A | B |

TABLE 2

|  | EXAMPLE 4 | EXAMPLE 5 | EXAMPLE 6 |
| --- | --- | --- | --- |
| LIQUID CRYSTAL MONITOR | LIQUID CRYSTAL DISPLAY (135°) | LIQUID CRYSTAL DISPLAY (135°) | LIQUID CRYSTAL DISPLAY (135°) |
| FIRST SHEET | REFLECTIVE POLARIZING FILM (135°) | REFLECTIVE POLARIZING FILM (45°) | POLYCARBONATE FILM |
| SECOND SHEET | HIGH-RETARDATION FILM (90°) | HIGH-RETARDATION FILM (90°) | HIGH-RETARDATION FILM (90°) |
| THIRD SHEET | INFRARED CUT-OFF FILM | INFRARED CUT-OFF FILM | INFRARED CUT-OFF FILM |
| FOURTH SHEET | — | — | REFLECTIVE POLARIZING FILM (0°) |
| FIFTH SHEET | — | — | POLYCARBONATE FILM |
| RATING | A | B | A |

TABLE 3

| | COMPARATIVE EXAMPLE 1 |
|---|---|
| LIQUID CRYSTAL MONITOR | LIQUID CRYSTAL DISPLAY (135°) |
| FIRST SHEET | INFRARED CUT-OFF FILM |
| RATING | C |

In Example 1, a high-retardation film is provided upon the liquid crystal display, so that, although the birefringent properties of the infrared-reducing film impart the linearly polarized visible light emitted by the liquid crystal display LC with elliptical polarization properties, the visible light having passed through the infrared-reducing film after the high-retardation film exhibits reduced occurrence of rainbow glare after being reflected by the float glass FG. In other words, s-wave reflectance by the float glass FG is greater than p-wave reflectance in the visible spectrum, while the wavelength interval, within which polarization direction of the visible light varies, greatly shortens, resulting in a quasi-depolarized state as seen on average with respect to wavelength. For this reason, even in a case where the infrared-reducing film imparts elliptical polarization properties to the visible light having passed through the high-retardation film, the elliptical polarization is inconspicuous when reflected by the float glass FG, resulting in reduced rainbow glare. The slow axis of the high-retardation film preferably forms an angle of 45° with respect to the transmission axis of the liquid crystal display; adjusting this angle within a range of 15° to 75° allows observers to perceive bright visible light from the infrared cut-off film.

In Example 2 and Example 3, a reflective polarizing film is laid over the infrared cut-off film of Example 1. In Example 2, the direction of the transmission axis of the reflective polarizing film is a direction in which s-waves out of the polarized components of the light having passed through the infrared cut-off film mainly transmit; in Example 3, the direction of the transmission axis of the reflective polarizing film is a direction in which p-waves mainly transmit. In the majority of the visible spectrum, the s-wave reflectance of the float glass FG is greater than the p-wave reflectance thereof; thus, the infrared cut-off film of Example 2 allows observers to perceive brighter light than does the infrared cut-off film of Example 3. In Example 2 and Example 3, the high-retardation film is provided, and observers observed no rainbow glare. In Example 2, the transmission axis of the reflective polarizing film has an angle of inclination of 0° with respect to the x-axis; adjusting this angle of inclination in a range from −25° to 25° allows observers to perceive bright visible light from the infrared cut-off film.

In Example 4 and Example 5, the reflective polarizing film is laid between the liquid crystal display and the infrared cut-off film of Example 1. In Example 4, the direction of the transmission axis of the reflective polarizing film is substantially parallel to the transmission axis of the liquid crystal display, and the majority of the linearly polarized light from the liquid crystal display is transmitted. In Example 5, the direction of the transmission axis of the reflective polarizing film is substantially orthogonal to the transmission axis of the liquid crystal display, and the majority of the linearly polarized light from the liquid crystal display is blocked.

The optical intensity of the visible light traveling toward the float glass FG in Example 4 is greater than that of the visible light traveling toward the float glass FG in Example 5; thus, the infrared cut-off film of Example 4 allows observers to observe brighter visible light than does the infrared cut-off film of Example 5. In both Example 4 and Example 5, a high-retardation film is provided; thus, observers observe no rainbow glare caused by the infrared cut-off film. In Example 4, the transmission axis of the reflective polarizing film has an angle of inclination of 135° with respect to the x-axis; adjusting this angle of inclination in a range from 120° to 160° allows observers to perceive bright visible light from the infrared cut-off film.

In Example 6, polycarbonate films are laid on both sides of the infrared cut-off film of Example 3. Although the birefringent properties of the polycarbonate films may impart the linearly polarized visible light emitted by the liquid crystal display with elliptical polarization properties, the visible light having passed through the high-retardation film exhibits reduced occurrence of rainbow glare in the eyes of observers. This reduction indicates that the elliptical polarization of the visible light from the infrared cut-off film has become inconspicuous when reflected by the float glass FG, resulting in reduced rainbow glare.

REFERENCE SIGNS LIST

1 Display device
3 Infrared cut-off film
10 Light source
20 Display unit
30 Infrared cut-off part
31 First polymer film
31a Infrared cut-off layer
32 Second polymer film
40 Reflecting part
L1, L2, L3, L4 Visible light

The invention claimed is:

1. A display device comprising:
    a display unit configured to have display information and to emit visible light having a continuous spectrum and a linear polarization state;
    an infrared cut-off part configured to transmit the visible light from the display unit and to reduce an amount of infrared light striking the display unit; and
    a reflecting part configured to reflect the visible light having passed through the infrared cut-off part, wherein
    the infrared cut-off part comprises a first polymer film and a second polymer film,
    the first polymer film includes an infrared cut-off layer configured to reduce transmission of the infrared light, and
    the second polymer film includes a high-retardation polyester film having a retardation from 8000 nm to 30000 nm, both inclusive, and is disposed between the first polymer film and the display unit, the second polymer film converting the linear polarization state to a quasi-depolarized state.

2. The display device according to claim 1, wherein the high-retardation polyester film contains at least one of polyethylene terephthalate and polyethylene naphthalate.

3. The display device according to claim 1, wherein the infrared cut-off part comprises a reflective polarizing film.

4. The display device according to claim 1 further comprising first and second light path converters, the first light path converter forming a pair with the second light path converter to alter a path of the visible light between the display unit and the infrared cut-off part.

* * * * *